Figure 1:
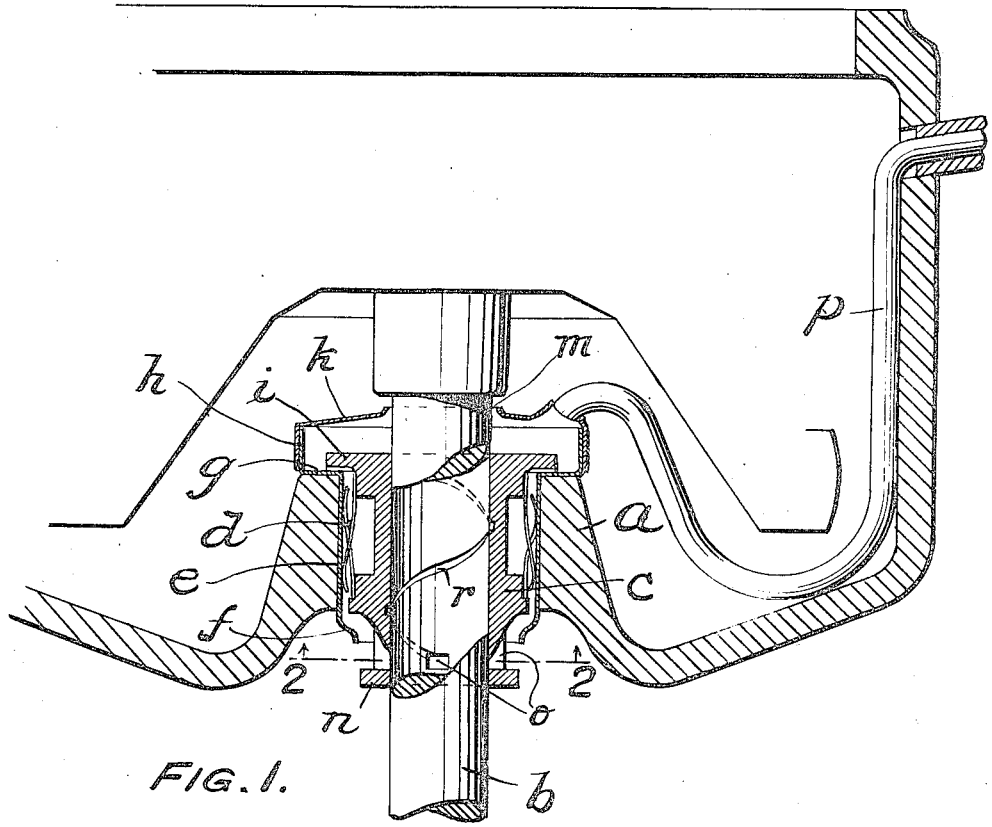

M. LEITCH.
BEARING FOR CENTRIFUGAL CREAM SEPARATORS.
APPLICATION FILED JUNE 14, 1916.

1,212,371.  Patented Jan. 16, 1917.

WITNESS:

INVENTOR
Meredith Leitch
BY
ATTORNEY.

UNITED STATES PATENT OFFICE.

MEREDITH LEITCH, OF POUGHKEEPSIE, NEW YORK, ASSIGNOR TO THE DE LAVAL SEPARATOR COMPANY, A CORPORATION OF NEW JERSEY.

BEARING FOR CENTRIFUGAL CREAM-SEPARATORS.

1,212,371.  Specification of Letters Patent.  Patented Jan. 16, 1917.

Application filed June 14, 1916. Serial No. 103,648.

*To all whom it may concern:*

Be it known that I, MEREDITH LEITCH, a citizen of the United States, residing at Poughkeepsie, county of Dutchess, and State of New York, have invented a new and useful Improvement in Bearings for Centrifugal Cream-Separators, of which the following is a full, clear, and exact description, reference being had to the accompanying drawings, which form a part of this specification.

The object of my invention is to provide a bearing adapted more especially for a top bearing for the spindle of the bowl of a centrifugal separator.

More particularly the object is to provide a bearing which may be oiled from the splash oiling system within the casing for the driving mechanism and also from an independent source of supply of fresh oil.

A further object of the invention is to provide means whereby a liberal supply of oil may be secured and a constant circulation of the oil through the bearings maintained, thereby neutralizing the effect of the possible passage from the bowl casing to the upper end of the bearing of any more than a negligible quantity of water, milk or other foreign material.

A further object of the invention is to so construct the bearing that it may be readily applied to existing separators without the necessity of reconstructing such separators.

Figure 2:
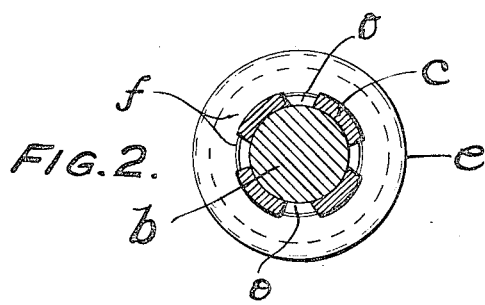

A preferred embodiment of the invention is shown in the drawings, in which:

Figure 1 is a vertical sectional view of a bearing embodying my invention and Fig. 2 is a cross-section on the line 2—2 of Fig. 1.

The bowl casing $a$, integral with the machine frame, is shaped and bored, as usual, to provide for the extension therethrough of the bowl spindle $b$ and the cylindrical bearing $c$. The bearing $c$ is so flanged and shaped as to hold between it and the bore of the casing a bearing spring $d$.

So far as described the construction may be said to be well known and typical. In my invention I provide a drawn steel tubular shell $e$ of a diameter adapted to fit tightly within and against the bore and to directly engage the spring $d$. At its bottom this shell is flanged inwardly at $f$. The upper end of the shell is flanged outwardly at $g$ to overlie the casing and thence upwardly at $h$. The upper end of the bearing $c$ is provided with a flange $i$ extending over, and spaced from, the horizontal flange $g$ of the shell $e$. Secured to the vertical flange $h$ of the shell $e$ is a cap $k$ adapted to shed water. The top of the cap $k$ is provided with a central orifice $m$ of greater diameter than the diameter of that part of the spindle extending through it. Above the lower flanged end $n$ of the bearing $c$ there are formed a plurality of preferably radial orifices $o$. The outer part of the flange $n$ is directly beneath the lower or inner edge of the flange $f$ of the shell. An oil supply tube $p$ extends through the bowl casing and registers with a hole in the cap $k$. The inner wall of the bearing is provided with a helicoidal groove $r$ extending throughout the height of the bearing and in such direction relatively to the direction of rotation of the spindle $b$ as to adapt it to pump oil from the holes $o$ to the space beneath the cap $k$. Oil from the tube $p$ passes into the space over the bearing $c$ and beneath cap $k$ and by gravity passes down between the bearing and the shell $e$ and drops off the lower edge of the flange $f$ onto the flange $n$, whence it passes inwardly to the spindle $b$ through the holes $o$. If a splash oil system is arranged within the machine casing alongside the spindle, as is customary in centrifugal separators, oil from this system will also pass into the holes $o$. The helicoidal groove in the bearing will carry the oil upwardly into the open space beneath the cap $k$, whence it will pass outwardly and thence, with fresh oil from the tube $p$, gravitate down between the bearing and the shell and drop onto the flange $n$, thus completing the circuit.

It has been found impracticable, owing to the vibration of the spindle, to have a neat fit between the cap $k$ and the spindle, and an annular space of substantial width should therefore be left between the spindle and the cap. Any water or milk in the bowl casing will tend to be shed by the cap, but if any small quantity of water or other foreign matter passes down between the spindle and the cap it will be displaced outwardly by the upflowing film of oil. Owing to the excess of oil supplied to the bearing from the splash system and the oil tube $p$, oil is constantly overflowing at the flange $n$, and any water or milk mixed with the oil will ultimately pass into the interior of the machine casing, wherein it eventually settles to the bottom and is withdrawn by means well known in the art. Further, modern improvements have succeeded in carrying out of the bowl casing any milk or water that finds its way thereinto, so as to reduce to a minimum the tendency of any foreign matter to enter the top bearing.

It will be observed that the open space beneath the cap $k$ is of generous dimensions and that the oil is free to flow down between the bearing and the shell at a substantially faster rate than it is pumped up by the spindle and supplied by the oil tube $p$, thereby maintaining the space beneath the cap free of oil except for the film constantly being displaced outwardly and the oil dripping from the tube $p$.

While I have shown the shell $e$ as separate from the casing, it need not be so made, although it is preferred to so make it both on the ground of good mechanical construction and because of the desired adaptability of the bearing to machines of standard type.

Having now fully described my invention, what I claim and desire to protect by Letters Patent is—

1. In a centrifugal separator, the combination with the bowl spindle and the casing bored to receive the spindle, of a bearing surrounding the spindle and provided near its lower end with a hole opening to the spindle, a spring between the bearing and the casing, a cap supported from the casing and extending over the top of the bearing and spaced a substantial distance therefrom and having a central orifice through which the spindle extends, and means at the lower part of the bore of the casing adapted to convey to said hole oil gravitating between the casing and the bearing, there being a helicoidal groove between the spindle and the bearing adapted to convey oil upwardly through the bearing to the space beneath the cap.

2. In a centrifugal separator, the combination with the bowl spindle and the casing bored to receive it, of a bearing surrounding the spindle and spaced from the casing and provided near its lower end with a hole opening to the spindle, a spring between the bearing and the casing, a flange at the upper end of the bearing overhanging said casing and spaced vertically therefrom to allow oil to pass inwardly to the space around the bearing, there being a helicoidal groove between the spindle and the bearing adapted to carry oil upwardly through the bearing, and a cap supported from the casing and extending over and outside the top of the bearing and spaced therefrom vertically and laterally.

3. In a centrifugal separator, the combination with the bowl spindle and the casing bored to receive it, of a bearing surrounding the spindle and provided on its inner face with a helicoidal groove, a flange at the lower end of the bearing, said bearing being orificed above the flange, a flange at the upper end of the bearing overhanging said casing and spaced therefrom vertically, a cap supported from the casing and extending outside and over the top of the casing and spaced therefrom vertically and laterally and orificed centrally to allow the extension therethrough of the spindle, a spring between the bearing and the casing, and a member extending inward from the bore of the casing adapted to convey oil to the lower flange of the bearing.

4. In a centrifugal separator, the combination with the bowl spindle and the casing bored to receive it, of a bearing surrounding the spindle, there being a helicoidal groove between the spindle and the bearing, a tubular shell fitting within the bore, a spring between the shell and the bearing, the bearing being orificed at its lower part to allow oil to pass to the spindle, a centrally orificed cap carried by the shell and overhanging and spaced from the bearing, and means to direct oil gravitating between the bearing and shell to the oil orifice in the bearing.

5. In a centrifugal separator, the combination with the bowl spindle and the casing bored to receive it, of a bearing surrounding the spindle, there being a helicoidal groove between the spindle and bearing, a tubular shell fitting within the bore, a spring between the shell and the bearing, the bearing being orificed at its lower part to allow oil to pass to the spindle, an extension at the top of the shell extending outwardly, upwardly and inwardly, said inward extension forming a cap being spaced vertically from the bearing, a flange at the upper part of the bearing overhanging the casing, said flange being spaced vertically from said outward extension of the shell and laterally from said upward extension of the shell, a flange on the bearing beneath the oil orifice therein, and an inwardly extending flange on the lower end of the shell overhanging the second named flange.

6. In a centrifugal separator, the combination with the bowl spindle and the casing bored to receive the spindle, of a bearing surrounding the spindle and provided near its lower end with a hole opening to the spindle, a spring between the bearing and the casing, a cap a substantial distance above the bearing and having a central orifice through which the spindle extends, and means at the lower part of the bore of the casing adapted to convey to said hole oil gravitating between the bore and the bearing, there being a helicoidal groove between the spindle and the bearing adapted to convey oil upwardly through the bearing to the space beneath the cap.

In testimony of which invention, I have hereunto set my hand, at Poughkeepsie, on this 9th day of June, 1916.

MEREDITH LEITCH.